UNITED STATES PATENT OFFICE.

AUGUST LEOPOLD LASKA, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

AZO-DYESTUFFS AND PROCESS OF PRODUCING THE SAME.

1,206,232. Specification of Letters Patent. Patented Nov. 28, 1916.

No Drawing. Application filed February 25, 1916. Serial No. 80,392.

*To all whom it may concern:*

Be it known that I, AUGUST LEOPOLD LASKA, citizen of the German Empire, and resident of Offenbach-on-the-Main, in the Grand Duchy of Hessen, Germany, with the post-office address Wilhelmsplatz 18, have invented new and useful Improvements in Azo-Dyestuffs and Processes of Producing the Same, of which the following is a specification.

My invention relates to a process for the production of new azo dyestuffs and consists in combining diazo compounds obtained from asymmetrically alkylized p-diamino-azo bodies with arylids of 2.3-oxynaphthoic acid. In this manner very fast black dyestuffs are obtained, which may be produced as well in substance as on the fiber.

The new dyestuffs correspond to the following formula

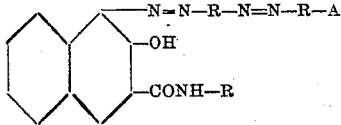

wherein A means an alkylamido group while R means aromatic residues. These dyestuffs when treated with hydrochloric acid and stannous chlorid are decomposed into an alkylized p-diamin, a p-diamin and an arylid of 1-amino-2-oxynaphthoic acid.

Of the asymmetrically alkylized diamino-azo bodies those may, for instance, be employed which are obtained by combination of diazotized p-nitranilin, o-chloro-p-nitranilin, nitro-toluidin ($CH_3:NH_2:NO_2=1:2:5$), nitro-o-anisidin ($OCH_3:NH_2:NO_2=1:2:5$) with dimethylanilin, dimethyl-m-toluidin, dimethyl-α-naphthylamin or analogues thereof and reduction of the thus produced nitro-azo dyestuffs, or by saponification of corresponding acetylamido dyestuffs.

Example: 240 parts of p-dimethylamino-p-amino-azobenzene are diazotized in the usual manner and poured into a well ice-cooled solution of the di-sodium salt from 270 parts of anilid of 2.3-oxynaphthoic acid to which sodium carbonate has been added in excess.

The dyestuff separates in black flakes; it is practically unsoluble in water and alcohol. When heated with hydrochloric acid and stannous chlorid the dyestuff is decomposed into dimethyl-p-phenylene-diamin, p-phenylene-diamin and anilid of 1-amino-2-oxynaphthoic acid.

The constitution of the dyestuff may be expressed by the following formula:

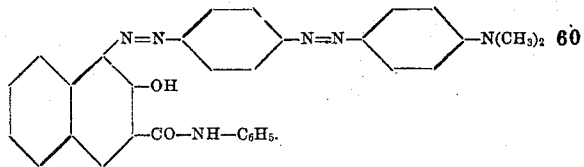

The following examples may show the production of the dyestuffs on the fiber. The cotton material after having been well boiled with sodium carbonate or caustic sodium is impregnated with the warm solution of arylid of 2.3-oxynaphthoic acid and is introduced while still wet or after drying into the dyebath; then the cotton material is well drawn, wrung out, left for some time, rinsed and made ready. For increasing the lasting quality or fastness of the dye against the usual injurious effect of sunlight, the material may be treated with a solution of copper salt.

*Padding solution of arylid of 2.3-oxynaphthoic acid.*

| | Middle tones. | Deep tones. |
|---|---|---|
| Anilid of 2.3-oxynaphthoic acid | 12 g. | 24 g. |
| Sodium lye 24° Bé | 20 ccm. | 40 ccm. |
| Sodium salt of ricinoleic acid | 25 g. | 40 g. |
| Filled up to | 1 liter | 1 liter. |

*Diazo solution.*—25 g. p-dimethylamino-p-aminoazobenzene are dissolved with 30 ccm. hydrochloric acid 20° Bé and 300 ccm. boiling water. After cooling are added 400 g. ice and a solution of 7.5 g. sodium nitrite dissolved in 50 ccm. water is let flow in in a thin ray. The whole is filled up to 1 liter.

*Dyebath for dyeing yarn in strands.*—250 ccm. of the above diazo solution are mixed with 750 ccm. cold water and filled up to 1 liter.

Before use the bath is neutralized with about 25 ccm. acetate of sodium 1:1.

*Dyebath for dyeing pieces.*—500 ccm. of the above diazo solution are mixed with 500 ccm. cold water and filled up to 1 liter.

Before use the bath is neutralized with about 50 ccm. acetate of sodium 1:1.

*Prescription for printing.*—450 ccm. of the above diazo solution are pasted with 500 g. tragacanth and before use neutralized with 50 ccm. acetate of sodium 1:1.

The formation of the dyestuff may be performed in the same manner with other arylids of the 2.3-oxynaphthoic acid (2.3-oxynaphtoylaminoaryls). Among the great number of the arylids in consideration the following may be given as examples: m-nitroanilid of 2.3-oxynaphthoic acid, α- and β-naphtalid of 2.3-oxynaphthoic acid, di-2.3-oxynaphtoyl-m-toluylene-diamin, di-2.3-oxynaphtoyl-p-phenylene-diamin, 2.3-oxynaphtoylthiazylamin, 2.3-oxynaphtoyl-p- or o-aminochinolin. All these arylids of 2.3-oxynaphthoic acid give when coupled with the diazo compounds from asymmetrically alkylized diaminoazo bodies deep black products with strong dyeing properties.

Now what I claim and desire to secure by Letters Patent is the following:

1. Process for the production of azo dyestuffs, which consists in combining the diazo compounds from asymmetrically alkylized p-diaminoazo bodies with arylids of 2.3-oxynaphthoic acid.

2. As new articles of manufacture the dyestuffs of the formula

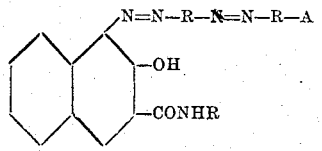

wherein A means an alkylamido group and R aromatic residues, which dyestuffs, when reduced give an alkylized p-diamin, a p-diamin and an arylid of 1-amino-2-oxynaphthoic acid.

That I claim the foregoing as my invention, I have signed my name in presence of two witnesses, this day of 2nd February, 1916.

AUGUST LEOPOLD LASKA.

Witnesses:
FRANZ AUVON,
ANTON DALLER.